Oct. 12, 1948.  A. DREYER  2,451,159
APPARATUS FOR THE CONTINUAL PRODUCTION
OF ELECTRICALLY WELDED TUBES
Filed March 6, 1945
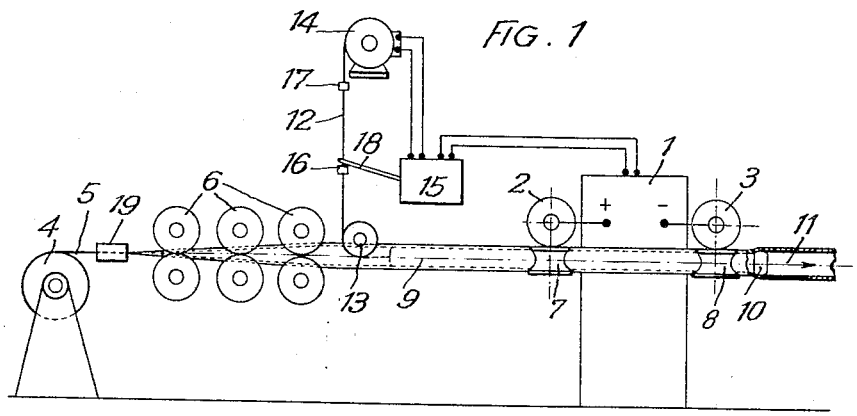
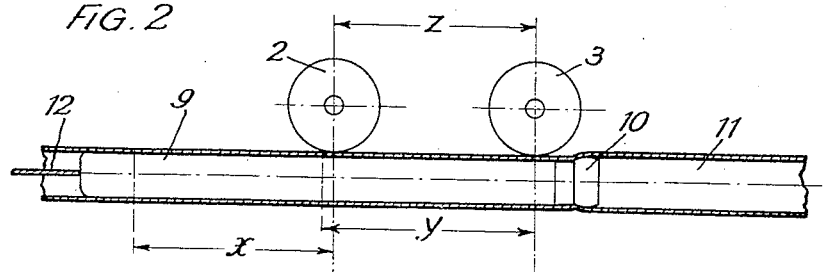
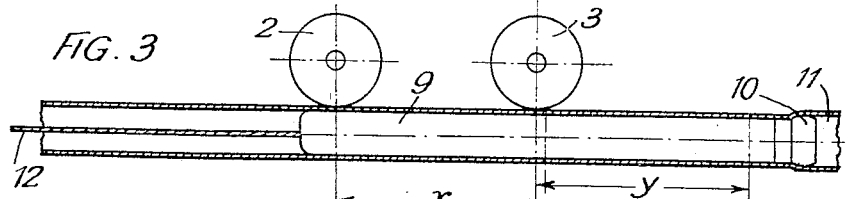
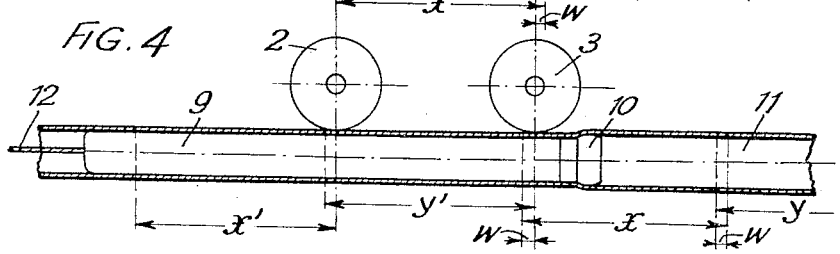
INVENTOR:
Albert Dreyer
by Sommers & Young
Attorneys

UNITED STATES PATENT OFFICE 2,451,159

APPARATUS FOR THE CONTINUAL PRODUCTION OF ELECTRICALLY WELDED TUBES

Albert Dreyer, Lucerne, Switzerland, assignor to Metallschlauchfabrik A. G., Lucerne, Switzerland Application March 6, 1945, Serial No. 581,230
In Switzerland February 11, 1944

4 Claims. (Cl. 219—6)

This invention relates to means for the continual production of electrically welded tubes from a metal band by crimping up the band into round shape and then electrically welding together the edges of the band so as to form a seam by resistance welding.

In the hitherto known methods of this kind the uniting of the band edges by welding so as to form a seam had been effected by means of a roller electrode and a copper rod or tube which served as a counter electrode interiorly of the tube to be welded and into which the electric current had been passed through a sliding shoe or a contact roller situated at the still open portion of the tube.

The length of the electrode roller used in such methods amounts ordinarily from about 6 to 20 meters. Longer inner electrodes are ordinarily not used on account of their considerable weight and the consequent inconvenient handling as well as their great space requirement. It will be readily understood that in using such inner electrodes it is indispensable that in advance of as well as in succession to the machine a space of at least electrode length is made available so that for a welding apparatus with a length of inner electrode of, for example, 30 m. a space requirement of a total available length of at least 65 m. inclusive of the length of space necessary for the welding machine proper must be provided. The drawback inherent in a great length of inner electrode consists in that the removal of said electrode from the welded tube frequently meets with considerable difficulty.

It is a known fact that in pulling the pipe on to a stationary electrode mandrel a sound welding seam cannot be obtained. The mandrel must, therefore, either move at exactly the same velocity as, and together with the pipe during the welding operation or the mandrel and the electrode must remain at rest and the electrode must move along the seam to be produced. The latter method is, however, suitable only for very short pipe lengths unless the welding transformer is also moved along, which is undesirable on account of the correspondingly heavy construction of the transformer and the thus ensuing great weight. Further, in order to obtain long lengths of pipe the length of work shop would again become excessive. Moreover, in pulling a pipe over a stationary inner electrode bar the wear on this bar becomes so great that it must be replaced after a relatively short time and apart from this the quality of the welding seam thus produced is entirely unsatisfactory.

In bending a band into tubular form about an inner electrode bar considerable interior stresses set up in the working material, that is, in the finished welded tube. The pipe shows a tendency to become deformed by action of said stressing so that the work of pulling the electrode bar out of the welded pipe again is rendered difficult. The ensuing interior stresses of the pipe are due to the appropriate formation of the band about the pipe being hampered by the length of electrode bar projecting rearwardly out of the pipe. Rounding a metal band into a tube without stressing the band is feasible only if during the rounding operation the band has its cross section so divided relative to the pipe that in each state of band deformation relative to the tube the cross section of the band is so divided with respect to the middle axis of the finished welded tube that one half of said cross section is situated above and the other half below said axis. In consequence thereof the portion of the band which is still flat, that is, that band portion which is situated at the entrance to the rounding tool would have to lie on the level of the middle axis of the finished tube. This is, however, possible only if the electrode bar is highly flexible.

Such deflecting without resulting permanent deformation is, however, possible only if the diameter of the electrode is relatively small. If the electrode bar does not deflect the band to be rounded is forcibly bent downwardly when passing into the entrance to the rounding implement and in that case the formation of the band into a tube can then be effected only by elongation of the working material with the consequent setting up of the above mentioned undesirable detrimental stressing of the tube. Therefore, the possibility of conveniently deflecting of the electrode bar diminishes as the tube diameter and together with it the diameter of the electrode bar increases. The inner stressing of the welded tube and the accompanying material adhesion between the welded tube and the inner electrode are liable to become at times so great that it is often absolutely impossible to remove the electrode bar from the tube so that the tube must be cut up in order to be disengaged.

By faultily deforming the band caused by the unduly long length of the inner electrode undesirable, high frictional resistances set up in the rounding implement. For compensating said resistance relatively great forces are thus required and as thin walled tubes are highly elastic the feed of the tube becomes intermittent, so that the welding spots are non-uniformly spaced apart, that is, the spacing between individual welding spots may become so large due to said intermittent feed of the tube that said spots overlap each other no more and thus untight portions of the welded seam ensue.

A further inconvenience arising in using long inner electrodes is that the operation of rounding the band can be effected only by means of, what may be termed, rounding dies instead of rounding rollers. Therefore, only very thin bands can be worked for the reason that bands of somewhat greater thickness can be worked solely by means of rounding rollers which, however, exclude the use of a long electrode bar, due to the interior of the split tube being obstructed by the profiling portions of the tube rounding rollers.

Further, the employment of such inner electrodes frustrates continuous tube manufacturing. After a length of tube substantially corresponding to the length of the inner electrode has been welded the supply of current and of tubular material must be interrupted for allowing the inner electrode to be retracted into initial position again. In order to obviate discontinuance of welding seam the whole welded tube must yet be slightly retracted prior to beginning the welding operation again, all said manipulations requiring at least quite as much time as the welding as such so that half the time available for the tube manufacture is lost.

The above-mentioned drawbacks of the conventional methods are intended to be eliminated by the employment of the apparatus according to the present invention in that during carrying out the welding along the seam two spaced roller electrodes that are connected with a source of electric energy run relatively to the seam longitudinally thereof, electric current being induced to pass between said rollers through the intermediary of a contact member also being moved along and the welding being interrupted predetermined periods apart while the feed movement of the tube is maintained constant and the contact member is returned into initial position again, whereupon the welding operation is continued, thereby to effect a tight continuous seam.

Due to the employment of two electrode rollers and a contact member accompanying them interiorly of the tube, which member may consist, for example, in a copper bar or tube, a double spot welded seam is produced, that is, incidental to each current impulse under each of the two electrode rollers a spot weld is obtained and a consequent tight longitudinal seam which is composed of successive pairs of individual overlapping spots. With this procedure the contact member may be relatively short as not serving as a means for supplying current, that is, as a counter electrode. The rounding of the tube is thus not impeded by the contact member. Therefore, the member can thus be retracted through the finished tube in a relative easy manner.

The present invention has for its object also a device wherein two roller electrodes, being arranged at a distance apart and connected with a source of electric energy, and a contact member are provided the length of which is greater than twice the spacing of the roller electrodes and is associated with means for retracting the contact member into initial position certain predetermined time periods apart.

An embodiment of a device according to the present invention is illustrated, by way of example only, in the accompanying drawings in which Fig. 1 is a schematic representation of the device, in side elevation;

Fig. 2 is a view illustrating the position of the two roller electrodes relative to that of the inner electrode bar at the beginning of the welding operation;

Fig. 3 is a view illustrating the position of the roller electrodes relative to the contact bar on the termination of the welding period shortly before the contact bar is retracted, and Fig. 4 is a view illustrating the contact bar to be again in initial position shortly before the welding current is switched on anew.

In Fig. 1, the welding transformer which is designated by 1 has its two poles connected with two electrode rollers 2, 3. A reel 4 is provided with a metal band 5 to be formed into the tube to be manufactured. Three pairs of tube rounding rollers 6 for forming the band into a split tube are arranged successive to the reel 4. Laterally disposed pairs of rollers 7, 8 for maintaining the split tube in closed condition while it is welded together by the roller electrodes 2, 3 are correlated to said electrodes.

Inside of the tube a contact member 9 in form of a copper bar is arranged which has the function to close a circuit for current to pass between the two electrode rollers. To the contact member 9 a gauging mandrel 10 is fixed which serves the purpose of dimensioning the welded tube accurately to the prescribed gauge; the tube having been completely welded and dimensioned to the prescribed gauge is designated by 11.

With one of the ends of the contact member 9 a wire cable 12 is connected which passes over a shaft 13 and the other end of which is wound on a portion of a rope sheave 14. A change over switch 15 is provided with a control arm 18 which cooperates with rope clamps 16, 17 which are instrumental in actuating the switch 15 by serving as stops. Further, between the reel 4 and the rounding rollers 6 is arranged a device 19 for cleaning and oiling the band 5.

The driving arrangement for actuating the rope sheave 14 is not shown in detail in the drawings. This arrangement may be coupled to the rope sheave directly. Also the conveying device for advancing the welded tube 11 in the direction of the arrow shown in Fig. 1 is not illustrated in the drawings. This conveying device may be constructed in any desired manner, for example, it may be in form of gripping claws which function alternately to grasp and to release the tube, one pair of gripping claws at least being kept closed at all times, thereby to obtain a continual uniform removal of the tube. This device may further be provided in a known manner with an automatically operating severing contrivance for cutting the completely welded tubes into any marketable lengths as ordered.

In producing tubes from very thin bands the rounding rollers 6 may simply be replaced by a rounding die. Moreover, especially for the production of tubes of large diameters the contact member consisting in a solid copper bar must be replaced by a copper tube.

The working operation is as follows:

Whereas the tube 11 is continually advanced at constant speed, the contact member 9 is only intermittently moved at the same speed as the tube 11, being returned into initial position at certain spaced intervals while the tube 11 keeps on moving.

The gauging mandrel 10 in advancing pulls the contact member 9 which is fixed thereto along with it, the mandrel being in turn moved along by the friction set up in the tube 11.

The contact member 9 shares in the advance movement of the wire cable and thus unwinds from the rope sheave 14 until the rope clamp 17 moves along the control arm 18 of the change over switch 15, whereby the latter is controlled. In consequence thereof the primary of the welding transformer 1 is disconnected and the driving arrangement for actuating the rope sheave 14 is connected in circuit, so that the welding operation is discontinued and the return movement of the contact member 9 into initial position begins.

When the contact member 9 has arrived in initial position again the switch 15 is changed over anew by the rope clamp 16 actuating the control arm 18 of this switch, whereby the energizing circuit through the driving arrangement of the rope sheave 14 is broken again and the primary winding of the transformer is connected in circuit anew, thereby to again start the welding operation.

The conveying speed at which the welded tube 11 is advanced and the speed of return movement of the contact member 9 are exactly adapted to each other by the driving arrangement of the rope sheave 14, the switching on or off of the welding transformer 1 and of the driving arrangement of the rope sheave 14 respectively taking place synchronously.

In Fig. 2 the beginning of the welding operation is schematically illustrated. The inner contact member 9 shares in the movement of the tube 11 until by action of the roller electrode 2 a seam of a length $x$ is produced and by the electrode roller 3 at the same time a seam of a length $y$ is welded. The resulting length $x$, $y$ of welded seam always corresponds to the distance $z$ between the axes of the two electrode rollers 2, 3 plus a length of about 10 cm. This additional length of welding seam is designated by $w$ (Fig. 4), and represents the length along which the individual lengths of welded seams overlap each other in order to ensure that the resulting welding seam is reliably tight.

In Fig. 3 the position of the contact member at the end of the welding operation is shown at the moment at which the welding current is interrupted and the return movement of the contact member 9 begins, while the tube 11 is at the same time gauged to the exact measure by action of the gauging mandrel 10, and the tube 11 as such keeps on moving at constant speed.

The speed of return movement of the contact member 9, therefore, must be at least twice as high as the conveying speed of the tube 11.

In Fig. 4 the contact member 9 is shown to be in initial position again and the welding operation to begin anew, during which the roller electrode 2 welds the seam along the length $x'$ and the roller electrode 3 welds the length $y'$ which overlap the previously effected length $x$ of welding seam by a length $w$ so that, as plainly visible in this figure, a continuous welding seam is produced by the cycles of welding repeating always in the same manner.

For retracting the contact member 9 it is not necessary to remove the roller electrodes 2, 3 from engagement with the suture for the reason that the bearing pressure therebetween is so slight only that the retracting operation is not hampered.

Due to the fact that in the present device the contact member does not serve as a counter electrode the wear on this member is substantially reduced and the life of the member is thus very great. By oiling the band 5 prior to rounding the tube adequate greasing of the contact member 9 and of the gauging mandrel 10 is provided for. The thin oil film impairs the quality of the resistance welding in no way, as experience has proved, but brings with it the advantage that in consequence thereof the life of the roller electrodes is increased, due to the tendency of said electrodes of getting stuck diminishing.

Obviously, the welding according to the present invention will, preferably, be carried out by current control, especially if non-ferrous metals or alloyed steels are concerned.

I claim,

1. In apparatus for the continual production of electrical resistance-welded tubes from a metal band, bending means for giving to the metal band a tubular form having a longitudinal split portion, two roller electrodes for supplying welding current and provided on said longitudinal split portion of said tube with terminals spaced apart longitudinally, a contact member surpassing in length the two-fold amount of said distance bridging said electrode rollers interiorly of said tube for producing a continuous flux path of electric welding current through said split portion at said spaced electrodes, means for effecting continuous relative rolling motion between said terminals and said split portion as well as said contact member, flexible means provided with stops controlled by an electrically drivable sheave, one end of said flexible means attached to said contact member and passed at the other end about said sheave, a change over switch connectible in circuit with said contact member and said sheave drive respectively, and alternately cooperable with a different said stop for welding said split portion along said member by releasing said drive, while said rolling motion is maintained and said flexible means unwound from said sheave, and actuating said drive for winding said flexible means on said sheave for retracting said contact member into initial position again, while said drive is actuated, thereby to produce a continuous tight welded seam at said split.

2. In apparatus for the continuous production of resistance welded tubes from a thin gauge metal band, means for bending the band to tubular form with a longitudinal split in one side thereof, two longitudinally spaced roller electrodes engaging the split side of the tube, an elongated cylindrical contact member within the tube and movable with it, said member having a length greater than the spacing of the electrodes and serving as a current bridging means between said electrodes, means controlled by forward movement of said contact member for periodically retracting it, and other means controlled by movement of the contact member for controlling the supply of current to the electrodes.

3. In apparatus for the continuous production of resistance welded tubes from a thin gauge metal band, means for bending the band to tubular form with a longitudinal split in one side thereof, two longitudinally spaced roller electrodes engaging the split side of the tube, an elongated cylindrical contact member within the tube and movable with it, said member having a length greater than the spacing of the electrodes and serving as a current bridging means between said electrodes, a cable connected to the rear end of said contact member, means for winding said cable to move said member rearwardly, and means controlled by movement of the cable for periodically causing actuation of the winding means to return said member to its rearmost position.

4. In apparatus for the continuous production of resistance welded tubes from a thin gauge metal band, means for bending the band to tubular form with a longitudinal split in one side thereof, two longitudinally spaced roller electrodes engaging the split side of the tube, an elongated cylindrical contact member within the tube and movable with it, said member having a length greater than the spacing of the electrodes and serving as a current bridging means between said electrodes, electrical means for periodically moving the contact member rearwardly to starting position, and means controlled by movement of the contact member for controlling the electrical means.

ALBERT DREYER.

REFERENCES CITED

The following references are of record in the file of this patent:

UNITED STATES PATENTS

| Number | Name | Date |
|---|---|---|
| 1,808,122 | Sonnichsen et al. | June 2, 1931 |
| 2,024,485 | Sussman | Dec. 17, 1935 |

FOREIGN PATENTS

| Number | Country | Date |
|---|---|---|
| 12,479 | Great Britain | 1914 |
| 501,959 | Great Britain | March 8, 1939 |

OTHER REFERENCES

Applegate, "Resistance Seam Welding Automobile Gas Tanks," The Welding Journal, November 1934. Pages 16 and 17.